(12) United States Patent
Tsuchiya et al.

(10) Patent No.: US 9,770,668 B2
(45) Date of Patent: Sep. 26, 2017

(54) ANGLE DETECTING DEVICE AND SERVO APPARATUS USING SAME

(71) Applicant: Futaba Corporation, Mobara-shi (JP)

(72) Inventors: Hiroyuki Tsuchiya, Mobara (JP); Ippei Konishi, Mobara (JP)

(73) Assignee: FUTABA CORPORATION, Mobara-Shi (JP)

( * ) Notice: Subject to any disclaimer, the term of this patent is extended or adjusted under 35 U.S.C. 154(b) by 92 days.

(21) Appl. No.: 14/709,911

(22) Filed: May 12, 2015

(65) Prior Publication Data

US 2015/0330811 A1 Nov. 19, 2015

(30) Foreign Application Priority Data

May 13, 2014 (JP) .................. 2014-099761

(51) Int. Cl.

| | |
|---|---|
| *G05B 1/06* | (2006.01) |
| *H02P 23/12* | (2006.01) |
| *H02K 29/08* | (2006.01) |
| *A63H 27/00* | (2006.01) |
| *G01D 5/14* | (2006.01) |
| *G05D 3/14* | (2006.01) |
| *A63H 30/04* | (2006.01) |

(52) U.S. Cl.
CPC ............. *A63H 27/02* (2013.01); *A63H 30/04* (2013.01); *G01D 5/14* (2013.01); *G01D 5/145* (2013.01); *G05D 3/14* (2013.01)

(58) Field of Classification Search
CPC ........ G01D 5/145; G01D 5/147; G01D 3/036; G01D 5/12; G01D 5/24452; G01D 5/2448; G01D 5/2449; G01D 5/2451; G01D 5/2492; G01D 5/3473; G01D 5/34792; G01P 3/487; G01P 3/481; G01P 13/04; G01P 3/4815
USPC ............ 318/400.14, 400.38, 653; 324/207.2, 324/207.21
See application file for complete search history.

(56) References Cited

U.S. PATENT DOCUMENTS

| | | | | |
|---|---|---|---|---|
| 3,893,059 | A | * | 7/1975 | Nowak .................. G01P 3/481 257/E43.002 |
| 3,969,644 | A | * | 7/1976 | Nowak .................. G01P 3/481 257/E43.002 |
| 4,373,486 | A | * | 2/1983 | Nichols .................... F02P 7/07 123/617 |
| 4,503,391 | A | * | 3/1985 | Hinke .................. F02P 7/0675 310/68 B |
| 4,897,914 | A | * | 2/1990 | Loubier ................. G01D 5/142 29/602.1 |
| 5,258,735 | A | * | 11/1993 | Allwine, Jr. ............. G01B 7/30 335/302 |

(Continued)

FOREIGN PATENT DOCUMENTS

| | | | |
|---|---|---|---|
| CN | 20120263486.9 | * | 7/2012 |
| CN | 20120263521.7 | * | 7/2012 |

(Continued)

*Primary Examiner* — Paul Ip
(74) *Attorney, Agent, or Firm* — Bacon & Thomas, PLLC (57) ABSTRACT

An angle detecting device includes a rotatably supported magnet, and a magnetic sensor disposed opposite to the magnet. An output of the magnetic sensor is changed based on a magnetic flux change due to a rotation of the magnet. The magnet is disposed such that a distance between the magnetic sensor and the magnet is changed by the rotation of the magnet.

3 Claims, 10 Drawing Sheets

(56) References Cited

U.S. PATENT DOCUMENTS

| | | | | |
|---|---|---|---|---|
| 5,313,159 A * | 5/1994 | Allwine, Jr. | | G01B 7/30 310/156.32 |
| 6,124,709 A * | 9/2000 | Allwine | | G01B 7/30 324/207.2 |
| 6,163,148 A * | 12/2000 | Takada | | B62M 6/45 180/206.3 |
| 6,275,025 B1 * | 8/2001 | Wiese | | G01D 5/147 324/207.2 |
| 6,323,641 B1 * | 11/2001 | Allwine | | G01D 5/145 324/207.2 |
| 6,404,185 B1 * | 6/2002 | Allwine | | G01D 5/145 324/207.2 |
| 6,443,536 B1 * | 9/2002 | Tracht | | B60T 8/368 303/116.4 |
| 6,448,761 B1 * | 9/2002 | Stumpe | | G01D 5/145 324/207.2 |
| 6,542,068 B1 * | 4/2003 | Drapp | | G01R 33/07 257/425 |
| 6,552,532 B1 * | 4/2003 | Sako | | G01D 5/145 324/207.12 |
| 6,584,838 B2 * | 7/2003 | Lorenzen | | G01F 23/38 73/290 R |
| 6,639,399 B2 * | 10/2003 | Schroeder | | G01D 5/147 324/165 |
| 6,734,667 B2 * | 5/2004 | Lorenzen | | G01F 23/38 324/207.2 |
| 6,940,678 B2 * | 9/2005 | Kuo | | G11B 5/59633 360/77.03 |
| 7,191,861 B2 * | 3/2007 | Bui | | B62M 6/40 180/206.1 |
| 7,426,978 B2 * | 9/2008 | Onizuka | | B62D 5/0409 180/444 |
| 7,477,029 B2 * | 1/2009 | Son | | H02P 6/17 318/400.01 |
| 7,615,959 B2 * | 11/2009 | Son | | H02P 6/182 318/400.34 |
| 7,983,074 B2 * | 7/2011 | Zhu | | B82Y 25/00 365/158 |
| 8,028,973 B2 * | 10/2011 | Ford | | B66F 3/44 187/203 |
| 8,115,479 B2 * | 2/2012 | Aimuta | | G01D 5/145 324/207.25 |
| 8,125,216 B2 * | 2/2012 | Thomas | | 324/207.2 |
| 8,140,286 B2 * | 3/2012 | O'Gorman | | F16H 59/70 702/94 |
| 8,215,673 B2 * | 7/2012 | Ford | | B60S 9/12 180/41 |
| 8,228,718 B2 * | 7/2012 | Zhu | | B82Y 25/00 365/158 |
| 8,283,914 B2 * | 10/2012 | Mehnert | | G01D 5/145 324/207.13 |
| 8,294,457 B2 * | 10/2012 | Schrubbe | | G01D 5/06 324/207.2 |
| 8,424,393 B1 * | 4/2013 | Lee | | G01L 3/1435 73/862.331 |
| 8,466,672 B2 * | 6/2013 | Dixon | | G01D 5/145 324/167 |
| 8,564,283 B2 * | 10/2013 | Mita | | G01D 5/145 324/207.12 |
| 8,587,295 B2 * | 11/2013 | Aimuta | | G01D 3/02 324/207.24 |
| 2002/0105322 A1 * | 8/2002 | Schroeder | | G01D 5/147 324/207.25 |
| 2002/0178810 A1 * | 12/2002 | Lorenzen | | G01F 23/38 73/313 |
| 2003/0117132 A1 * | 6/2003 | Klinghult | | G01D 5/147 324/207.25 |
| 2003/0177827 A1 * | 9/2003 | Lorenzen | | G01F 23/38 73/313 |
| 2003/0193735 A1 * | 10/2003 | Kuo | | G11B 5/59633 360/77.03 |
| 2005/0007104 A1 * | 1/2005 | Lequesne | | G01D 5/145 324/207.25 |
| 2005/0217923 A1 * | 10/2005 | Onizuka | | B62D 5/0409 180/444 |
| 2005/0231841 A1 * | 10/2005 | Kuo | | G11B 5/59633 360/15 |
| 2006/0065460 A1 * | 3/2006 | Bui | | B62M 6/40 180/220 |
| 2007/0080016 A1 * | 4/2007 | Onizuka | | B62D 5/0409 180/444 |
| 2007/0085500 A1 * | 4/2007 | Son | | H02P 6/182 318/400.41 |
| 2007/0152625 A1 * | 7/2007 | Son | | H02P 6/17 318/815 |
| 2009/0033173 A1 * | 2/2009 | Moura | | H02K 29/03 310/254.1 |
| 2009/0072816 A1 * | 3/2009 | Schrubbe | | G01D 5/06 324/207.2 |
| 2009/0146767 A1 * | 6/2009 | Zhu | | B82Y 25/00 335/302 |
| 2009/0174395 A1 * | 7/2009 | Thomas | | G01D 5/145 324/207.2 |
| 2009/0189134 A1 * | 7/2009 | Ford | | B60S 9/12 254/418 |
| 2009/0189558 A1 * | 7/2009 | Ford | | B66F 3/44 318/400.38 |
| 2009/0206827 A1 * | 8/2009 | Aimuta | | G01D 5/145 324/207.25 |
| 2009/0253130 A1 * | 10/2009 | Yoo | | B01F 13/0059 435/6.11 |
| 2010/0141244 A1 * | 6/2010 | Bartos | | G01D 5/12 324/207.21 |
| 2010/0156397 A1 * | 6/2010 | Yabusaki | | G01B 7/30 324/207.2 |
| 2010/0213927 A1 * | 8/2010 | Mehnert | | G01P 3/4815 324/207.2 |
| 2010/0250184 A1 * | 9/2010 | Kawamura | | G01D 5/145 702/151 |
| 2010/0321008 A1 * | 12/2010 | Mita | | G01D 5/145 324/207.25 |
| 2011/0040513 A1 * | 2/2011 | O'Gorman | | F16H 59/70 702/94 |
| 2011/0101901 A1 * | 5/2011 | Zhu | | H02K 16/00 318/400.14 |
| 2011/0106489 A1 | 5/2011 | Satoh et al. | | |
| 2011/0121676 A1 * | 5/2011 | Zhu | | B60L 11/1803 310/156.35 |
| 2011/0187355 A1 * | 8/2011 | Dixon | | G01D 5/145 324/207.2 |
| 2011/0227568 A1 * | 9/2011 | Dordet | | G01D 5/145 324/251 |
| 2011/0315656 A1 * | 12/2011 | Zhu | | B82Y 25/00 216/22 |
| 2012/0038348 A1 * | 2/2012 | Aimuta | | G01D 3/02 324/207.24 |
| 2013/0057118 A1 * | 3/2013 | Benkert | | F16C 19/00 310/67 R |
| 2013/0091959 A1 * | 4/2013 | Lee | | G01L 3/1435 73/862.335 |
| 2013/0091960 A1 * | 4/2013 | Lee | | G01L 3/1435 73/862.335 |
| 2013/0242289 A1 * | 9/2013 | Miyajima | | G01D 5/3473 356/72 |
| 2013/0293220 A1 * | 11/2013 | Metivier | | G01B 7/30 324/207.2 |
| 2013/0342191 A1 * | 12/2013 | Gunawan | | G01R 27/00 324/207.11 |
| 2013/0346003 A1 * | 12/2013 | Gunawan | | G01R 27/00 702/65 |
| 2014/0167743 A1 * | 6/2014 | Park | | G01D 5/145 324/207.2 |
| 2014/0210390 A1 * | 7/2014 | Huang | | H02P 6/165 318/400.04 |

(56) References Cited

U.S. PATENT DOCUMENTS

| | | | |
|---|---|---|---|
| 2014/0259637 A1* | 9/2014 | Hannewald | H02K 29/08 |
| | | | 29/598 |
| 2015/0070002 A1* | 3/2015 | Schott | G01D 5/145 |
| | | | 324/207.2 |
| 2015/0204694 A1* | 7/2015 | Huang | G01P 3/487 |
| | | | 324/207.2 |

FOREIGN PATENT DOCUMENTS

| | | |
|---|---|---|
| JP | 2000-131012 A | 5/2000 |
| JP | 2011-095207 A | 5/2011 |
| JP | 5425917 B2 | 2/2014 |

* cited by examiner

ANGLE DETECTING DEVICE AND SERVO APPARATUS USING SAME

FIELD OF THE INVENTION

The present invention relates to an angle detecting device for detecting a rotation angle of a rotation shaft by using a magnet and a magnetic sensor; and, more particularly, to an angle detecting device for use in a servo apparatus.

BACKGROUND OF THE INVENTION

An angle detecting device is attached to a rotation shaft in order to detect the number of revolution and a rotation angle of the rotation shaft.

As for an apparatus for performing a control operation by using the angle detecting device, there is known a servo apparatus for use in a radio-controlled model (RC model), an industrial machine, a robot or the like.

The servo apparatus performs feedback control based on a control signal received from a controller and a rotation angle of a rotation shaft. The rotation shaft serves as an output shaft and the rotation angle of the rotation shaft is obtained by the angle detecting device. Further, the servo apparatus performs a control operation such that the rotation angle of the output shaft is equal to a rotation angle received from the control signal.

Particularly, the servo apparatus for use in a remotely controlled apparatus such as a RC model or the like is connected to a receiver and operates based on a control signal transmitted from the controller to the receiver.

In the angle detecting device of the servo apparatus for use in the RC model, a potentiometer has been conventionally used as a detecting element. The potentiometer uses a variable resistor and detects a rotation angle of the output shaft based on an output voltage that varies depending on the rotation angle of the output shaft.

The potentiometer is widely used as a detecting element due to its cost effectiveness. The potentiometer uses a variable resistor and thus includes a resistor and a brush. Since the resistor and brush operate in contact with each other, the resistor or a sliding portion is worn as they are used for a long time. Especially, when the resistor is worn, a resistance is changed, which may result in deviation of the reference position of the output shaft or misdetection of the rotation angle of the output shaft.

Therefore, an angle detecting device using a non-contact type magnetic sensor as a detecting element and a servo apparatus using the same have been developed and disclosed in Japanese Patent Application Publication No. 2011-030376.

Figure 7:
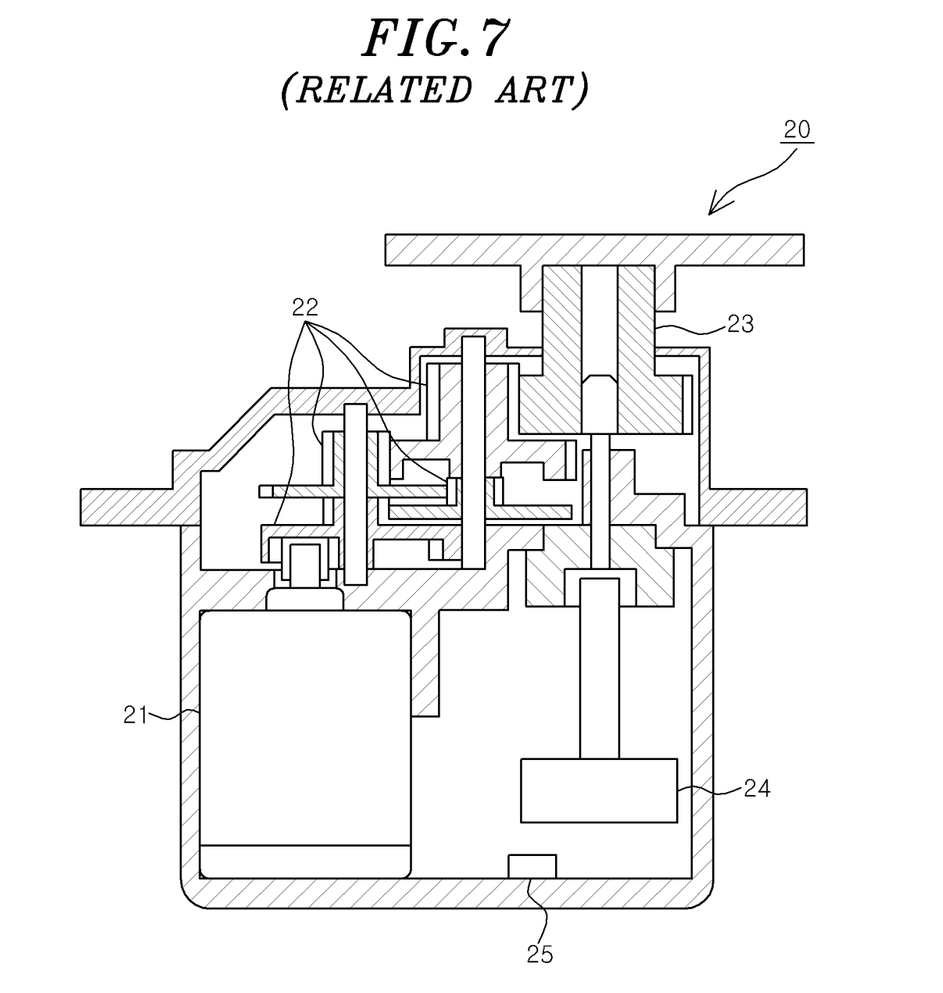
FIG. 7 shows a configuration of a conventional potentionless servo apparatus.

Hereinafter, a configuration of the servo apparatus using the magnetic sensor which is disclosed in Japanese Patent Application Publication No. 2011-030376 will be described with reference to FIG. 7. A servo apparatus 20 includes a motor 21, speed reducers 22 for reducing a rotation speed of the motor 21 and transferring the reduced rotation, an output shaft 23 for transferring the torque of the final gear of the speed reducers 22, a magnet 24 connected to an end portion of the output shaft 23, a magnetic sensor 25 provided inside a case, and a control unit (not shown) provided inside the case.

The servo apparatus disclosed in Japanese Patent Application Publication No. 2011-030376 uses a Hall element as a magnetic sensor. Since the Hall element and the magnet are not in contact with each other, components thereof are not worn even if they are used for a long time, which removes the problem of the potentiometer becoming unable to detect the rotation angle.

However, in the case of using a magnetic sensor, a detectable rotation angle is generally narrower compared to that in the case of using a potentiometer. An example employing a Hall element as a magnetic sensor will be described with reference to FIGS. 4A and 4B.

Figure 4A:
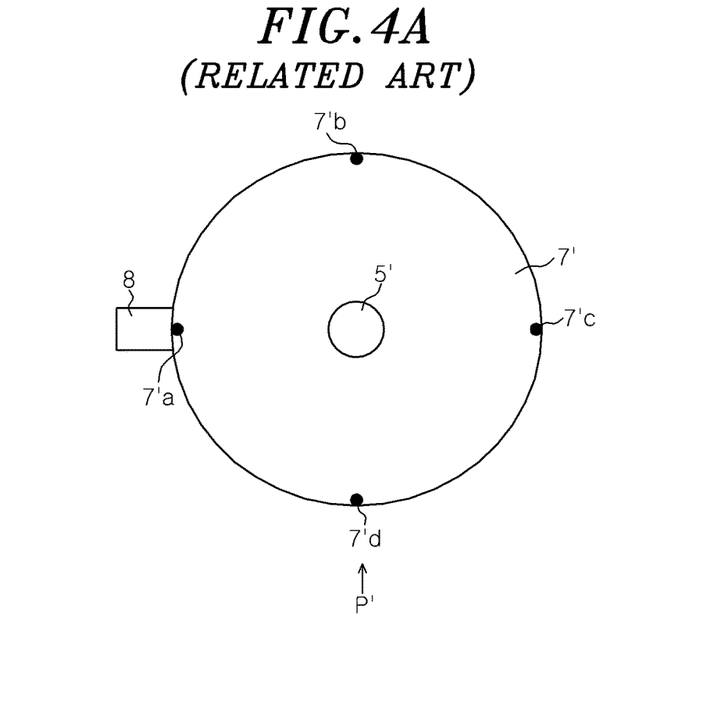
FIGS. 4A and 4B schematically show arrangement of a magnet of an angle detecting device in a comparative example.
Figure 5A:
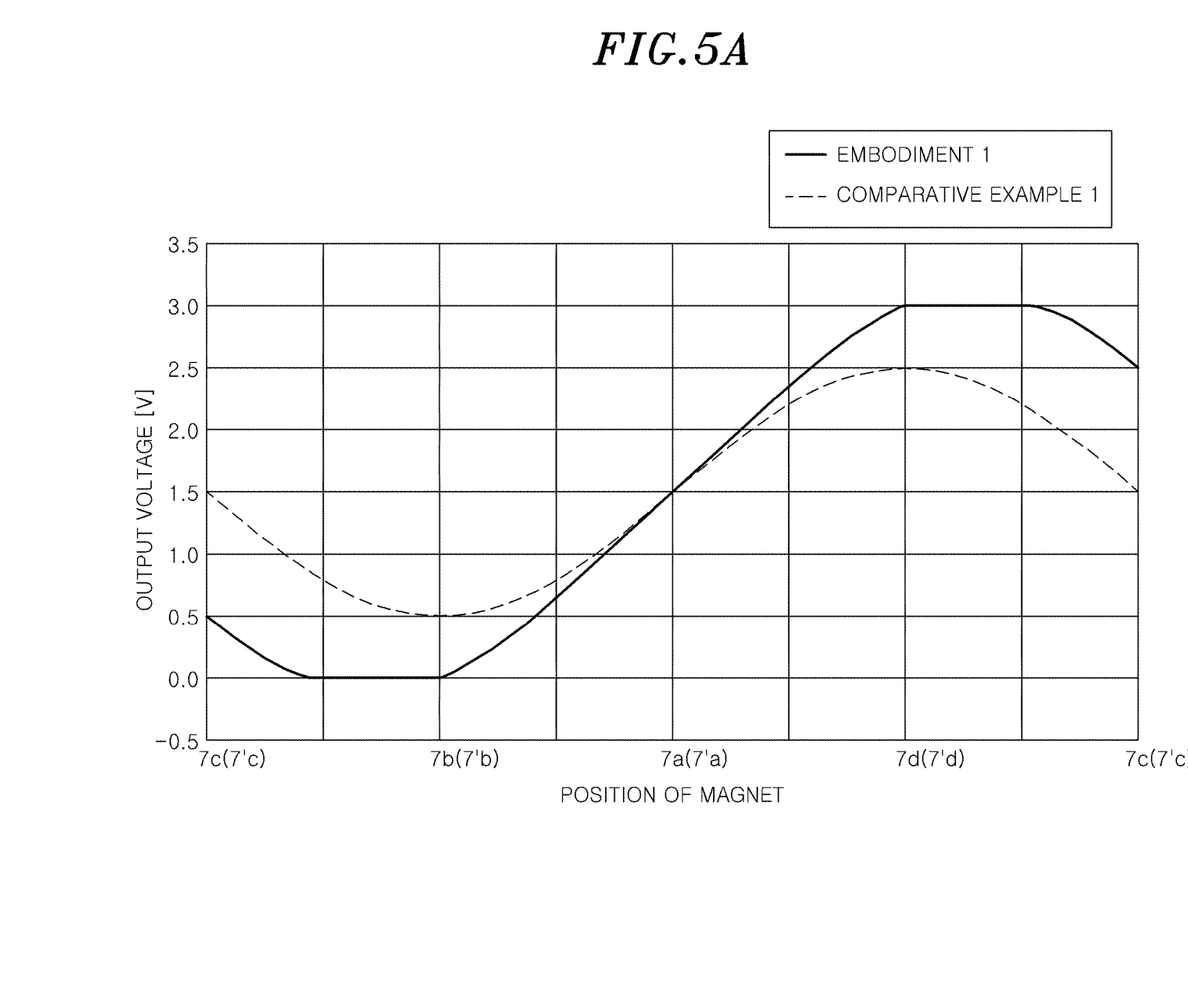
FIGS. 5A to 5C show outputs of a magnetic sensor in the embodiment of the present invention and the comparative example.
Figure 5B:
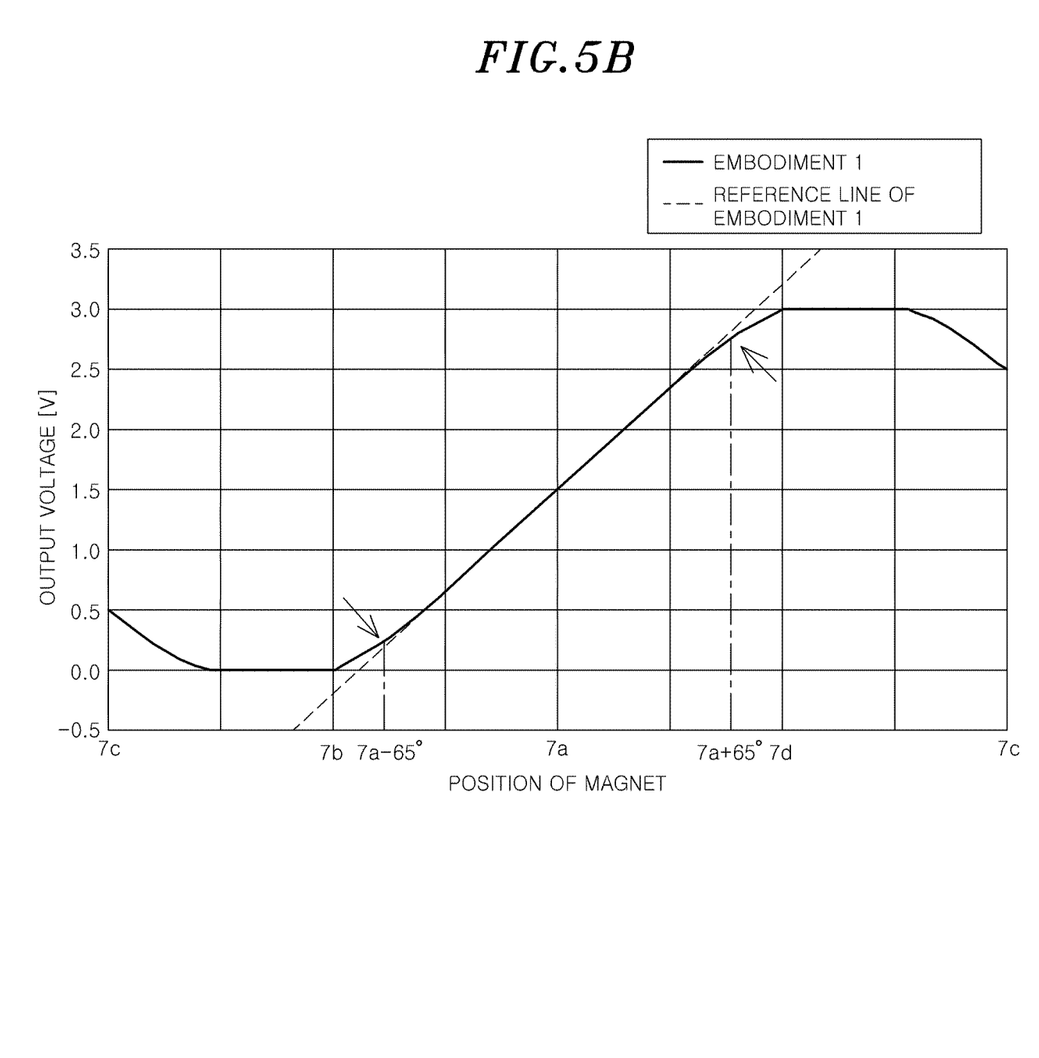
Figure 5C:
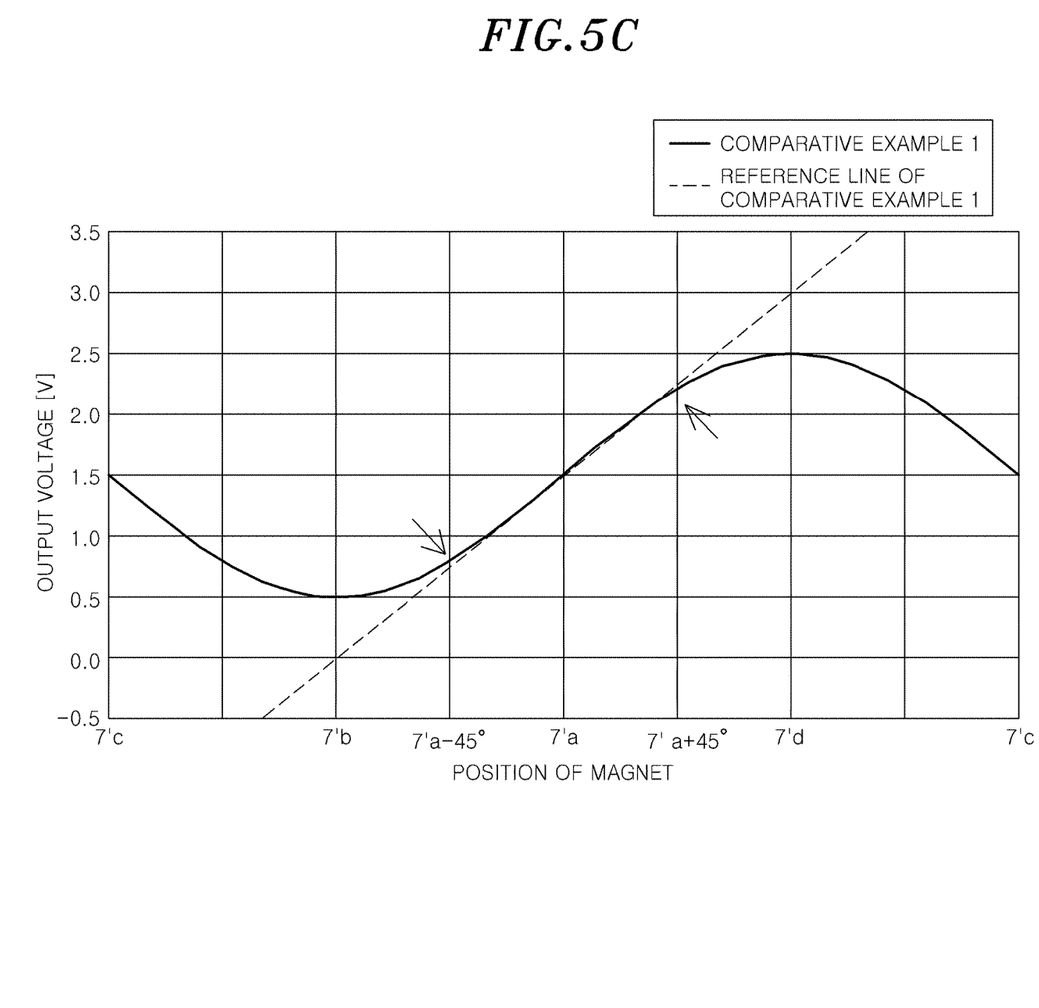

FIG. 4A illustrates a circular plate-shaped magnet 7' and a magnetic sensor 8 when seen in the axial direction of an output shaft 5'. Points 7'a, 7'b, 7'c, and 7'd are provided on a circumference of the magnet 7' such that they are spaced apart from each other at an interval of 90°. A point on the circumference of the magnet 7' which is closest to the magnetic sensor 8 is set to a position of the magnet. The relation between the position of the magnet and the output voltage is shown as a comparative example 1 in FIG. 5C. Referring to FIG. 5C, the output voltage with respect to the position of the magnet is linearly changed within a range of ± about 45° from the point 7'a. In such a range, the rotation angle can be detected.

On the other hand, in a servo apparatus for use in a RC model, it is desired to detect a rotation angle within a range of ± about 60° from the reference position. In a servo apparatus for use in an industrial machine, it is desired to detect a rotation angle within a range of ± about 75° from the reference position.

SUMMARY OF THE INVENTION

In view of the above, the present invention is intended to increase a detection range of a magnetic sensor such as a Hall element or the like with an appropriate arrangement, without requiring special processing for a magnet or the Hall element.

In accordance with a first aspect of the present invention, there is provided an angle detecting device including: a rotatably supported magnet; and a magnetic sensor disposed opposite to the magnet, wherein an output of the magnetic sensor is changed based on a magnetic flux change due to a rotation of the magnet, wherein the magnet is disposed such that a distance between the magnetic sensor and the magnet is changed by the rotation of the magnet.

The magnet may be attached to a rotatable shaft and inclined with respect to the rotatable shaft.

The magnet may have a circular plate shape and is magnetized to have two poles symmetrical with respect to a linear line passing through a center of the circular plate.

The magnet may be inclined along a boundary line of the two poles.

The magnetic sensor may include a Hall element and an amplifying circuit.

In accordance with a second aspect of the present invention, there is provided a servo apparatus including: the angle detecting device described above; a motor; a speed reducer connected to the motor, the speed reducer serving to reduce a speed of an output of the motor; an output shaft connected to the speed reducer and the angle detecting device; and a control unit configured to compare an output of the angle detecting device with a control signal inputted from an outside and to control rotation of the motor such that a difference between the output of the angle detecting device and the control signal becomes zero.

The detectable range of the angle detecting device can be increased with an appropriate arrangement, without requiring special processing for a magnet or a magnetic sensor. Accordingly, the life span of the angle detecting device can be increased while maintaining the detectable range of the rotation angle in the conventional servo apparatus using a potentiometer.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Embodiment 1

Figure 1:
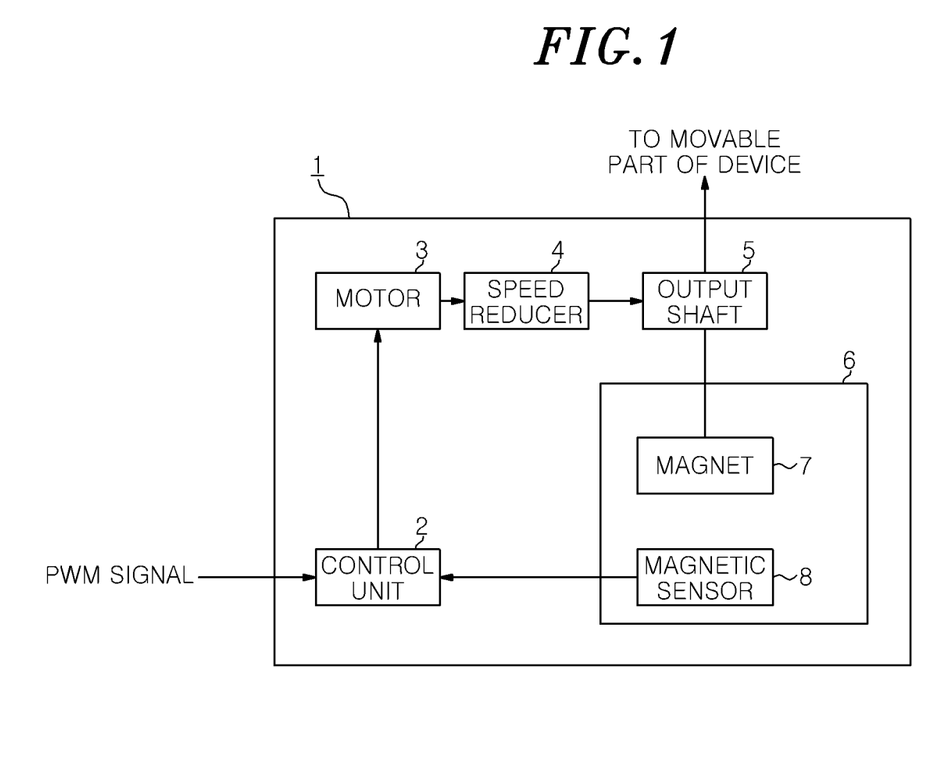
FIG. 1 is a block diagram of a servo apparatus in a embodiment of the present invention.
Figure 2:
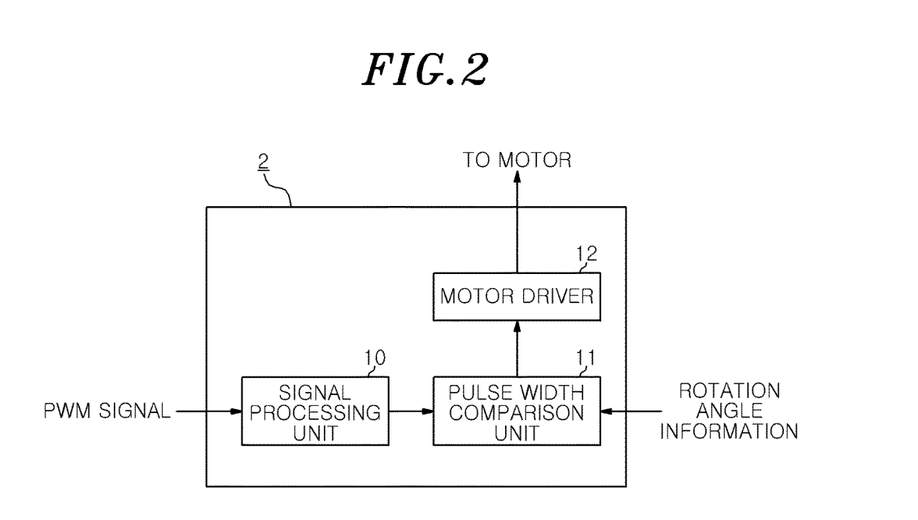
FIG. 2 is a block diagram of a control unit of the servo apparatus in the embodiment of the present invention.
Figure 3A:
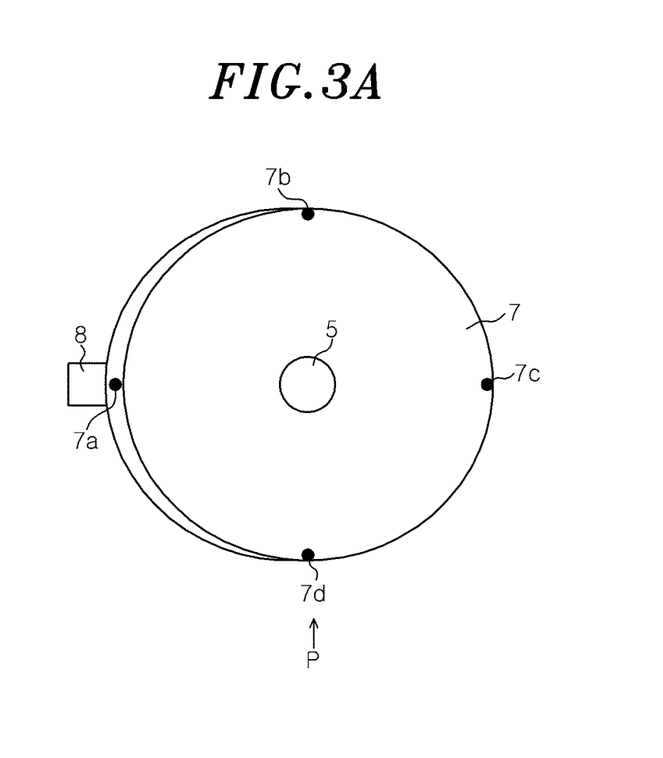
FIGS. 3A and 3B schematically show arrangement of a magnet of an angle detecting device in the embodiment of the present invention.
Figure 3B:
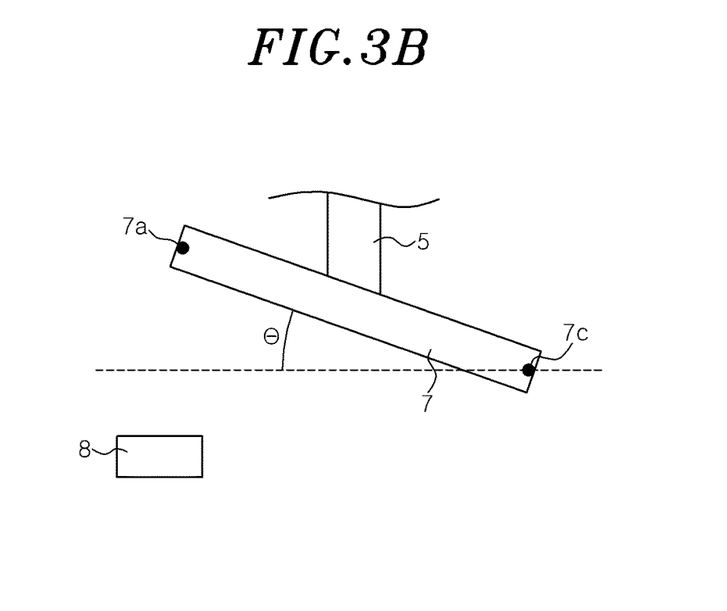

Hereinafter, an embodiment 1 for implementing the present invention will be described with reference to FIGS. 1 to 3B. FIG. 1 is a block diagram showing a configuration of a servo apparatus. FIG. 2 is a block diagram of a control unit of the servo apparatus. FIGS. 3A and 3B schematically show arrangement of a magnet 7 and a magnetic sensor 8 of an angle detecting device 6. FIG. 3A is a view of the magnet 7 seen in the axial direction of an output shaft 5. FIG. 3B is a view of the configuration of FIG. 3A seen from the P-direction.

In the embodiment 1, the servo apparatus 1 is used for a RC model.

First, there will be described peripheral components of the servo apparatus 1 which include components are not shown in drawings. The servo apparatus 1 is provided inside a remotely controlled device and connected to a receiver. The receiver receives a control signal from a controller and converts it to a pulse width modification signal (hereinafter, referred to as "PWM signal") for each channel. This PWM signal is inputted to the servo apparatus 1. The servo apparatus 1 controls driving of a movable part connected to the output shaft 5 based on the PWM signal.

The following is description on the components of the servo apparatus 1. The servo apparatus 1 includes a control unit 2, a motor 3, a speed reducer 4, an output shaft 5, and an angle detecting device 6.

The control unit 2 has a signal processing unit 10, a pulse width comparison unit 11, and a motor driver 12. The control unit 2 may use a single IC (Integrated Circuit) as a control LSI (Large Scale Integration). Alternatively, there may be employed a configuration in which a plurality of ICs and circuit devices are combined.

The signal processing unit 10 converts the PWM signal to target value information of the rotation angle of the output shaft 5 in accordance with a pulse width. The pulse width comparison unit 11 compares the target value information with rotation angle information received from the angle detecting device 6 to be described later and generates a differential signal such that a difference therebetween becomes zero. The motor driver 12 converts the differential signal to a driving signal for driving the motor 3 and outputs it to the motor 3.

The motor 3 outputs rotational movement based on the driving signal from the control unit 2. The speed reducer 4 includes one or more gears that transmit the output of the motor 3 to the output shaft 5 of the servo apparatus 1. A gear ratio of the speed reducer 4 is adjusted such that predetermined relation between the number of revolution of the motor 3 and the rotation angle of the output shaft 5 is satisfied.

The output shaft 5 is a rotation shaft for outputting a torque of the motor 3 to the outside at a predetermined gear ratio set by the speed reducer. In the case of using the servo apparatus 1 for a RC model as in the embodiment 1, one end portion of the output shaft 5 protrudes to the outside of the servo apparatus 1 to be connected to a movable part of the RC model through a connecting member such as a servo horn or the like (not shown).

The angle detecting device 6 has the magnet 7 and the magnetic sensor 8. The magnet 7 is attached to one end portion of the output shaft 5 to be rotatable together with the output shaft 5. The magnet 7 used in the embodiment 1 has a circular plate shape. Further, the magnet 7 is magnetized to have two poles with respect to a linear line passing through the center of the circular plate.

In the embodiment 1, a linear Hall IC including a hall element and an amplifying circuit is used as the magnetic sensor 8. The Hall element can output a change in magnetic flux density as a voltage value. Therefore, the Hall element combined with the amplifying circuit can output the change in magnetic flux density as the voltage change in an analog form. The rotation angle of the magnet 7 is obtained from the voltage value and outputted as rotation angle information to the control unit 2.

The following is description on the arrangement of the magnet 7 and the magnetic sensor 8 in the embodiment 1. FIG. 3A is a view of the magnet 7 seen in the axial direction of the output shaft 5. FIG. 3B is a view of the configuration of FIG. 3A seen from the P direction.

In FIG. 3B, on the assumption that the axial direction of the output shaft 5 is an up-down direction, the magnet 7 is inclined such that the point 7a is farthest from the magnetic sensor 8 and the point 7c is closest to the magnetic sensor 8 in the up-down direction. Specifically, the magnet 7 is inclined with respect to the output shaft 5 in the embodiment 1. The inclination of the magnet 7 is denoted by an angle θ with respect to the plane perpendicular to the axial direction of the output shaft 5. In this specification, the angle θ refers to the inclination of the magnet 7. In the embodiment 1, the magnet 7 is inclined at an angle of about 10°.

A distance between the magnet 7 and the magnetic sensor 8 indicates a distance between the magnetic sensor 8 and a point on the circumference of the magnet 7 which is closest to the magnetic sensor 8 during the rotation of the output shaft 5.

In the embodiment, the magnet 7 is magnetized such that the point 7b becomes the S pole and the point 7d becomes the N pole with respect to a diameter 7a-7c.

Embodiment 2

The arrangement of the magnet in accordance with an embodiment 2 is different from that in the angle detecting device and the servo apparatus in the embodiment 1. Since the other configurations are the same as those of the embodiment 1, the redundant description thereof will be omitted.

The arrangement of the magnet in the embodiment 2 will be described with reference to FIGS. 3A and 3B. In the embodiment 2, the magnet 7 is magnetized such that the point 7*a* becomes the N pole and the point 7*c* becomes the S pole with respect to a diameter 7*b*-7*d*.

Embodiment 3

The arrangement of the magnet in accordance with an embodiment 3 is different from that in the angle detecting device and the servo apparatus in the embodiment 1. Since the other configurations are the same as those of the embodiment 1, the redundant description thereof will be omitted.

The arrangement of the magnet in accordance with the embodiment 3 will be described with reference to FIGS. 3A and 3B. In the embodiment 3, the magnet 7 is magnetized such that the point 7*a* becomes the S pole and the point 7*c* becomes the N pole with respect to a diameter 7*b*-7*d*.

Comparative Example

A configuration of a comparative example will be described with reference to FIGS. 4A and 4B. The comparative example is a servo apparatus and an angle detecting device in which a magnet is disposed in parallel to a magnetic sensor as disclosed in Japanese Patent Application Publication No. 2011-030376. A solid line in FIG. 4B indicates the position of the magnet 7' in the comparative example and a dotted line in FIG. 4B indicates the position of the magnet 7 in the present embodiments. Since the other configurations are the same as those of the embodiment 1, the redundant description thereof will be omitted.

Figure 4B:
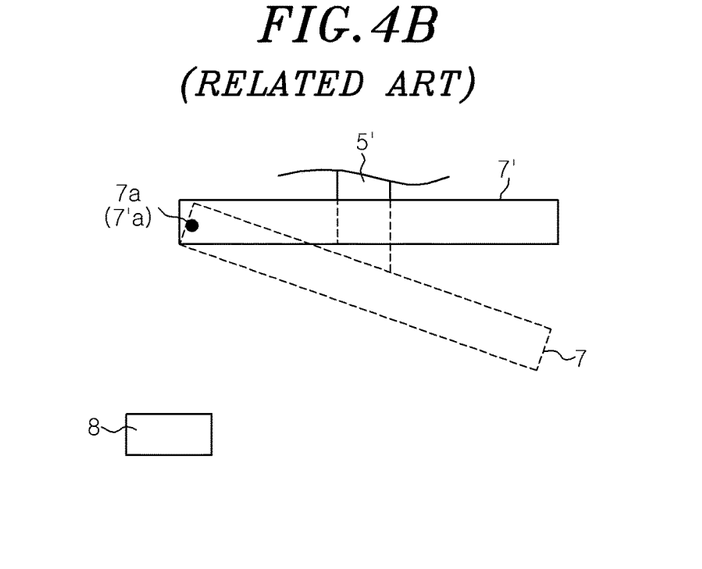

The distance between the magnetic sensor 8 and the point 7*a* of the magnet 7 in the axial direction in the present embodiments is adjusted to be equal to the distance between the magnetic sensor 8 and the magnet 7' in the axial direction in the comparative example, as can be seen from FIGS. 4A and 4B.

Figure 6A:
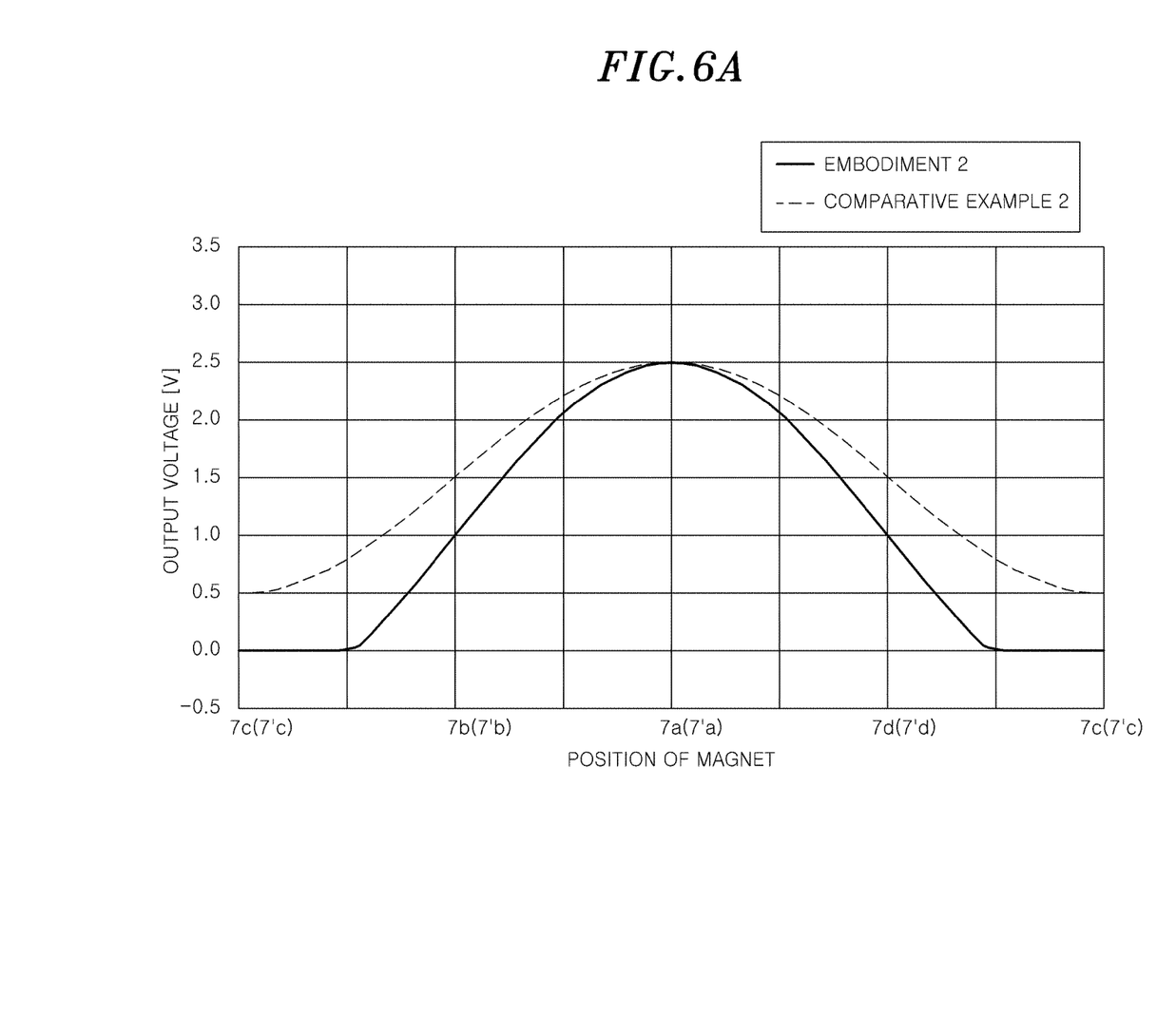
FIGS. 6A and 6B show outputs of a magnetic sensor in another embodiment of the present invention.
Figure 6B:
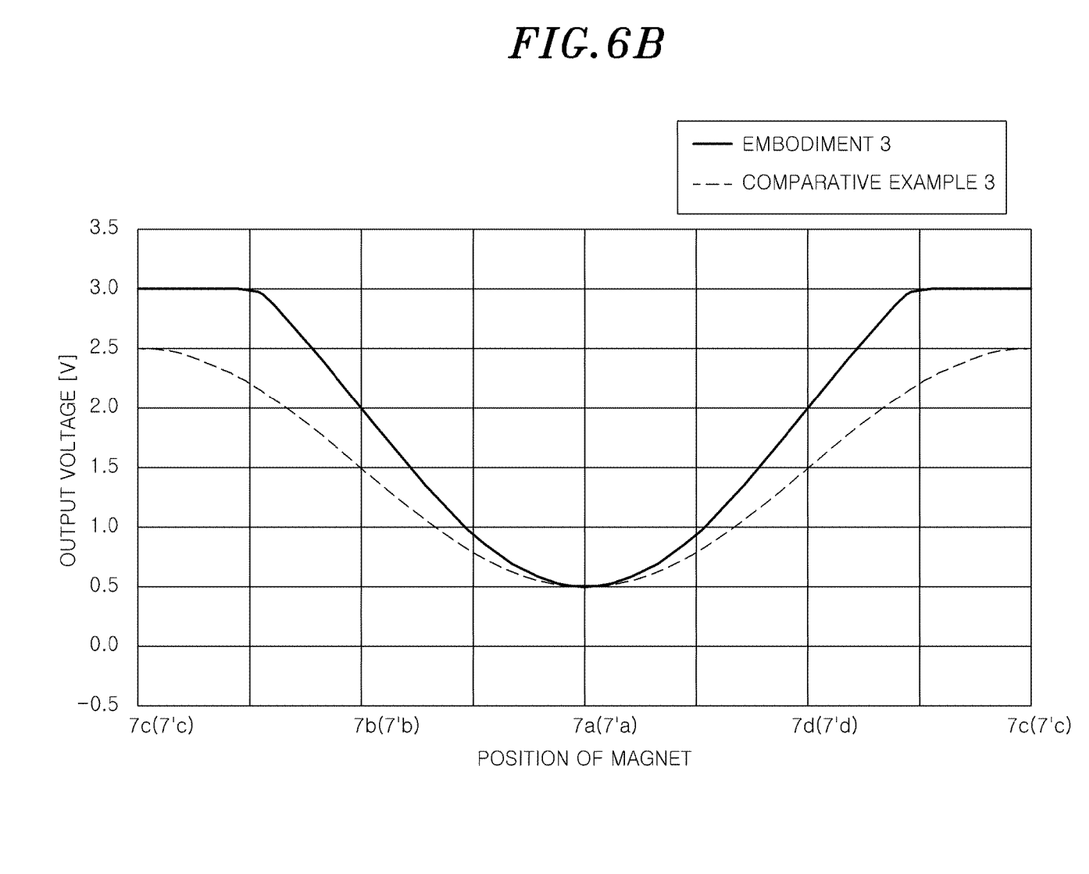

Comparative examples 1 to 3 respectively corresponding to the embodiments 1 to 3 in terms of the arrangement for magnetization of the magnet will be described.
(Comparison Result)
A result of comparison between the embodiment 1 and the comparative example 1 is shown in FIGS. 5A to 5C. FIG. 6A shows a result of comparison between the embodiment 2 and the comparative example 2. FIG. 6B shows a result of comparison between the embodiment 3 and the comparative example 3. As for the linear Hall IC as the magnetic sensor 8, there is used one that operates at an applied voltage of 3 V and outputs a voltage ranging from 0 V to 3 V.

In FIGS. 5A to 5C, the position of the magnet refers to a position of a point on the circumference of the magnet 7 or 7' which is closest to the magnetic sensor 8 during the rotation of the output shaft 5 or 5'. The linearity of the output voltage with respect to the point 7*a* or 7'*a* is compared between the embodiment 1 and the comparative example 1.

Hereinafter, the linearity will be described. First, in the embodiment 1, the reference linear line is a straight line passing through output voltages at two points corresponding to ±30° rotation angle of the output shaft 5 with respect to the point 7*a* in the graph showing the relation between the output voltage and the position of the magnet. Further, the linearity is defined by a percentage of a value obtained by subtracting a difference between an output voltage on the reference linear line and an actual output voltage at the same magnet position from a voltage applied to the linear Hall IC. In the same manner, in the comparative example 1, the reference linear line is a straight line passing through output voltages at two points corresponding to ±30 rotation angle of the output shaft 5 with respect to the point 7'*a* in the graph showing the relation between the output voltage and the position of the magnet. FIG. 5B shows the embodiment 1 and the reference linear of the embodiment 1. FIG. 5C shows the comparative example 1 and the reference linear line of the comparative example 1.

In the comparative example 1 in which the magnet 7' is arranged in a conventional manner, the output voltage is outputted substantially along the reference linear line within a range of about ±45° with respect to the point 7'*a*. At this time, the linearity of the position within the range of about ±45° from the point 7'*a* in the comparative example 1 is about ±1.5%. On the other hand, in the embodiment 1, when the linearity of about ±1.5% needs to be ensured, the detection range can be increased up to a range of about ±65° from the point 7*a*.

As can be seen from the comparison between the embodiments based on FIGS. 5A to 6B, the linearity of the output voltage of the magnetic sensor 8 is highest in the embodiment 1. Further, the linearity of the output voltage is improved and the detectable range is increased in the embodiments 2 and 3 compared to those in the comparative example 2 and 3.

The linear Hall IC used at this time outputs a voltage ranging from 0 V to 3 V. Therefore, the magnetic flux density is changed to be greater than a threshold value of the voltage and it is not possible to detect a certain range of the rotation angle in the embodiments. In that case, the detectable range of the rotation angle can be increased/decreased by controlling the sensitivity of the linear Hall IC even when the inclination of the magnet is equal to that in the embodiment.

While the embodiments have been described, the disclosure is not limited to the above-described embodiments.

For example, in the case of using a linear Hall IC having a higher sensitivity as the magnetic sensor, it is possible to improve the linearity of the output voltage and increase the detectable range of the rotation angle even when the inclination of the magnet becomes smaller.

When the inclination of the magnet is high, compared to when the inclination of the magnet is small, the magnetic field intensity seen from the magnetic sensor is remarkably changed even by slight rotation of the magnet and, thus, fluctuation (jitter) may occur in the rotation angle information. Accordingly, it is preferable to minimize the inclination of the magnet by using a magnetic sensor having a high sensitivity. Especially, the inclination of the magnet is preferably in the range of about 5° to 30°.

In the embodiments, the angle detecting device is used for a servo apparatus of a RC model. However, the angle detecting device of the present invention may also be used for other apparatuses for measuring an angle of the rotation shaft.

While the invention has been shown and described with respect to the embodiments, it will be understood by those skilled in the art that various changes and modifications may be made without departing from the scope of the invention as defined in the following claims.

What is claimed is:
1. An angle detecting device comprising:
a magnet attached to a rotatable shaft, the magnet having a circular plate shape and an even thickness, wherein the magnet is inclined with respect to a plane perpendicular to an axial direction of the rotatable shaft; and a magnetic sensor disposed opposite to the magnet, wherein an output of the magnetic sensor is changed based on a magnetic flux change due to a rotation of the magnet and to a change in a distance between the magnetic sensor and a point on a circumference of the magnet closest to the magnetic sensor, wherein the magnet is magnetized to have two poles symmetrical with respect to a linear line passing through a center of the circular plate, wherein the magnet is inclined along a boundary line of the two poles, and wherein, in the magnet, one end of the boundary line is farthest from the magnetic sensor and the other end of the boundary line is closest to the magnetic sensor in the axial direction.

2. The angle detecting device of claim 1, wherein the magnetic sensor includes a Hall element and an amplifying circuit.

3. A servo apparatus comprising:

an angle detecting device;

a motor;

a speed reducer connected to the motor, the speed reducer serving to reduce a speed of an output of the motor;

an output shaft connected to the speed reducer and the angle detecting device; and a control unit configured to compare an output of the angle detecting device with a control signal inputted from an outside and to control rotation of the motor such that a difference between the output of the angle detecting device and the control signal becomes zero, wherein the angle detecting device comprises:

a magnet attached to a rotatable shaft, the magnet having a circular plate shape and an even thickness, wherein the magnet is inclined with respect to a plane perpendicular to an axial direction of the rotatable shaft; and a magnetic sensor disposed opposite to the magnet, wherein an output of the magnetic sensor is changed based on a magnetic flux change due to a rotation of the magnet and to a change in a distance between the magnetic sensor and a point on a circumference of the magnet closest to the magnetic sensor, wherein the magnet is magnetized to have two poles symmetrical with respect to a linear line passing through a center of the circular plate, wherein the magnet is inclined along a boundary line of the two poles, and wherein, in the magnet, one end of the boundary line is farthest from the magnetic sensor and the other end of the boundary line is closest to the magnetic sensor in the axial direction.

\* \* \* \* \*